United States Patent Office 3,414,233
Patented Dec. 3, 1968

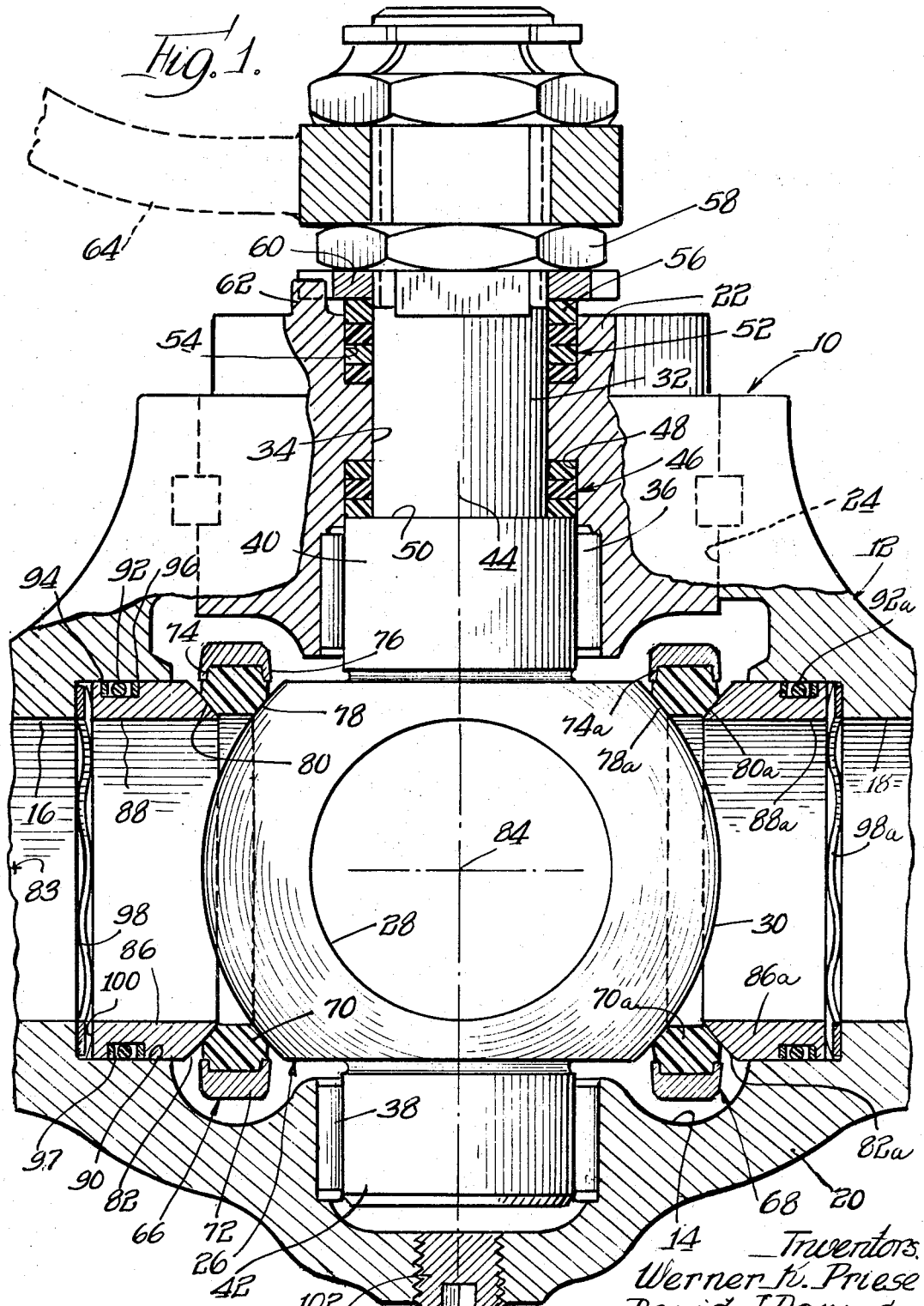

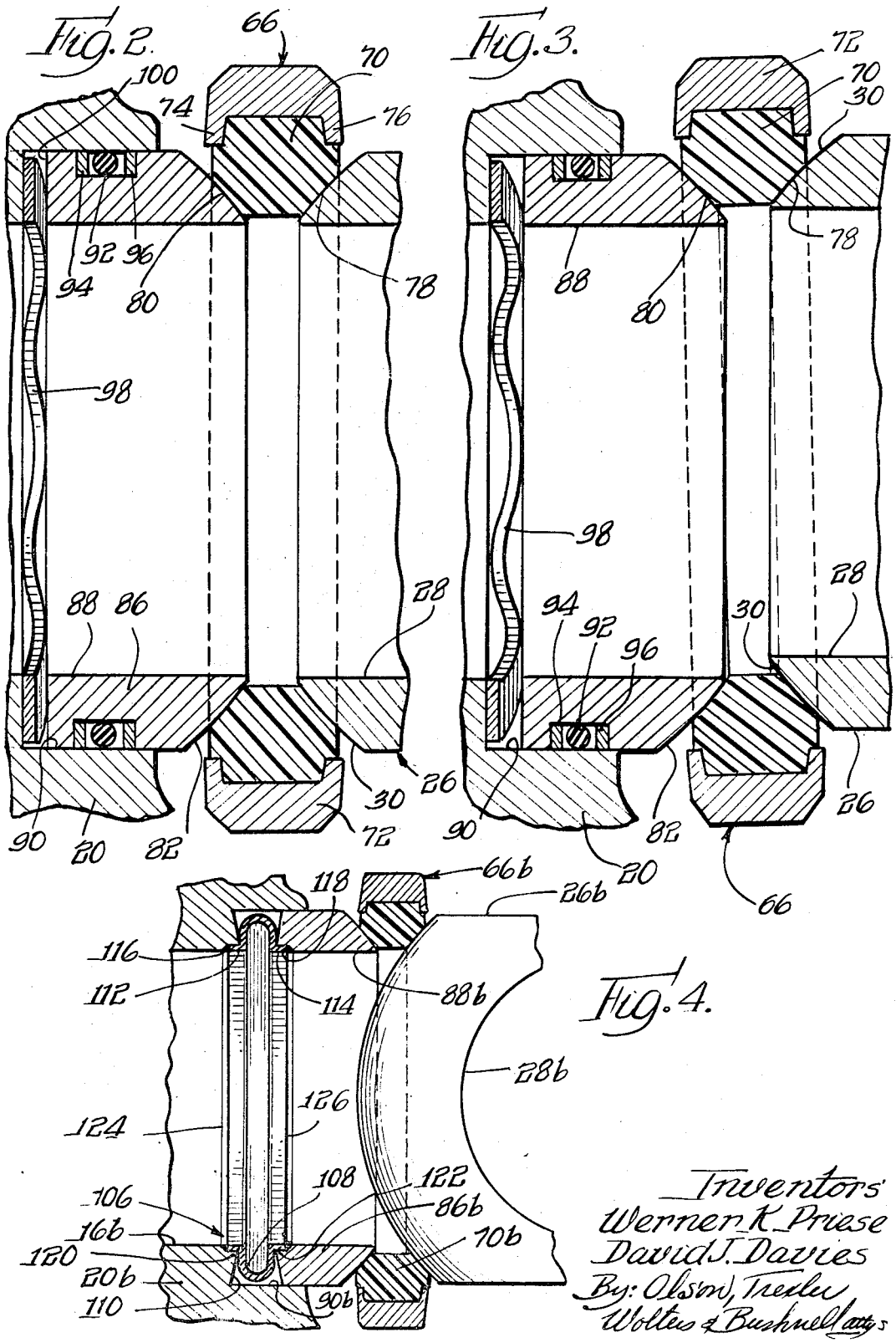

3,414,233
BALL VALVE
Werner K. Priese, Barrington, and David J. Davies, Naperville, Ill., assignors to Hills-McCanna Company, Carpentersville, Ill., a corporation of Illinois
Filed Oct. 20, 1966, Ser. No. 588,066
16 Claims. (Cl. 251—172)

The present invention relates to ball valves, particularly ball valves suitable for use in high pressure fluid service.

One object of the invention is to provide a ball valve having an improved construction which provides both the advantages of the control stem being integral with the valve ball and a highly effective control stem sealing construction, which incidentally is accompanied by an indefinite and variable location of the ball along the axis of the control stem while, at the same time, providing for highly effective and advantageous sealing of the valve in its closed condition against the passage of fluid through the valve for all of the various positions which the ball may occupy along the axis of the control stem.

Another object of the invention is to provide a ball valve containing a flow control ball journalled by bearings supported by the valve body means and having an improved construction which assures, when the valve is closed, a highly effective sealing of the valve against the passage of fluid therethrough while, at the same time, serving upon rotation of the valve between its open valve and closed valve positions to minimize the energy required to open and close the valve.

Another object is to provide a ball valve having an improved construction which is continuously sealed on the upstream side of the ball against leakage of fluid through the valve by a seat sealing action which is equally effective in sealing against all differential fluid pressures, including the lowest and highest, on the valve by means of a seat sealing pressure which is initially established and varied in accordance with the differential fluid pressure on the valve to continuously have an optimum value which is adequate, but not excessive, for blocking leakage of fluid through the valve.

Another object is to provide a ball valve of the character recited in the preceding objects which is equally effective in stopping the flow of fluid in either direction through the valve.

Another object of the invention is to provide an improved ball valve as recited in the preceding objects which utilizes yieldable polymeric seat rings of "solid" construction to advantage in sealing the valve against the flow of fluid therethrough.

Another object is to provide an improved ball valve according to the objects recited in which an optimum sealing pressure is established and continuously maintained on a floating valve seat to provide continuously effective and highly advantageous sealing of the valve against leakage of fluid therethrough by means of a translatable seat support which is sealed to the valve body means and continuously actuated to apply an optimum sealing pressure to the valve seat by means of an optimum combination of spring and fluid pressure forces on the seat support.

Another object is to provide a valve of the above character having an improved construction which minimizes the size, weight and cost of the valve while, at the same time, providing an inherent capability of the valve to withstand very high internal pressures in service.

Other objects and advantages will become apparent from the following description of the exemplary embodiments of the invention illustrated in the accompanying drawings, in which:

FIGURE 1 is a longitudinal side view, largely in section, of a ball valve constructed in accordance with the invention;

FIG. 2 is a fragmentary sectional view on a substantially enlarged scale showing one valve seat in axial section, a fragmentary adjacent portion of the valve ball (shown in open position), and coacting seat support structure;

FIG. 3 is a fragmentary sectional view similar to FIG. 2, but illustrating the relationships of the parts after the valve ball has been displaced upwardly somewhat from its position illustrated in FIG. 2; and FIG. 4 is a fragmentary sectional view similar to FIG. 2, but illustrating a modification of the structure used to bias and seal a seat support in relation to the valve body means.

Referring to the drawings in greater detail, the ball valve 10, forming the exemplary embodiment of the invention illustrated in FIG. 1, comprises valve body means 12 defining an internal valve chamber 14 and two flow passages 16, 18 opening into the chamber 14. In the preferred construction illustrated, the body means 12 comprises a main body section 20 and a circular bonnet 22 removably mounted in a circular opening 24 formed in the main body section 20 and having sufficient size to permit assembly of internal valve components into the body section 20.

Fluid communication between the passages 16, 18 is controlled by a valve ball 26 defining a flow passage or bore 28 and having an external surface 30 of spherical curvature. The ball 26 is disposed in the chamber 14 and is rotated to turn the bore 28 into and out of alignment with the passages 16, 18 by means of a control stem 32 extending out through a stem bore 34 formed in the bonnet 22. The major force of differential fluid pressure on the ball 26 is sustained by bearings 36, 38 supported on the body means 12 and coacting with trunnions 40, 42 on the ball 26 to journal the ball for rotation about the axis 44 of the control stem 32.

Advantages appreciated in the art are obtained by making the control stem 32 integral with the ball 26. In this instance, the control stem 32 is formed as a coaxial outward continuation of the trunnion 40, the stem 32 being of reduced diameter in relation to the trunnion 40. However, being integral with the control stem 32, the ball 26 is movable not only rotatably but also axially with the stem 32 with reference to the axis 44 of the control stem. The significance of this will appear later.

The valve is sealed against the outward leakage of fluid along the control stem 32 by highly advantageous sealing means which, despite its inherent advantages, is a source of imprecise location and variable displacement of the control stem 32, and hence the ball 26, along the axis 44 of the stem.

The advantageous sealing of the valve against outward leakage of fluid along the control stem 32 is achieved by means of an axially thick inner seal 46 of annular form constructed of a yieldable sealing material and disposed in an inner annular well 48 in encircling relation to the stem 32. The yieldable inner seal 46 is formed preferably of a yieldable polymeric material such, for example, as polytetrafluoroethylene. In the preferred construction illustration the seal 46 comprises three axially thick rings of polytetrafluoroethylene stacked in tandem in the inwardly open inner well 48 formed in the bonnet 26 by a counterbore in the inner end of the stem bore 34, which counterbore (to avoid confusion) is also denoted by the reference number "48." The inner seal 46 preferably has an axial thickness at least equal to its radial thickness, the axial thickness of the seal shown obvious being substantially greater than the radial thickness of the seal.

The inner axial face of the inner yieldable seal 46 is compressively engaged by an inner seal compressor 50 of annular form supported on the control stem 32. The seal compressor 50 extends into the inner end of the seal well 48 into engagement with the inner seal 46 as shown. In the preferred construction illustrated, the inner compressor 50 is formed by a radial shoulder, also denoted by the number 50, of annular form defined by the outer end of the trunnion 40 at the juncture of the trunnion 40 with the stem 32.

An outer yieldable stem seal 52 generally similar to the inner stem seal 46 is fitted into an outer seal well 54 in encircling relation to the stem 32. The outer well 54 opens axially outward and is formed preferably by a counterbore (also denoted by the number 54) in the outer end of the stem bore 34.

The outer seal 52 is compressively engaged by an outer seal compressor or gland 56 of annular form encircling the stem 34 and extending inwardly into the outer end of the well 54 into engagement with the seal 52.

The inner and outer yieldable seals 46, 52 are tightened simultaneously and to the same degree by a single seal tightening nut 58 threaded onto the exposed end of the stem 32 and acting inwardly on the outer seal compressor or gland 56 through an intervening stop washer or throw plate 60 encircling the stem 32 in nonrotatable, axially movable relation to the stem 32 and coacting with abutment means 62 on the bonnet 22 to terminate rotation of the ball 26 in its open valve and closed valve positions. Upon being tightened progressively, the single tightening nut 58 reacts inwardly through the throw plate 60 and outer compressor 56 on the outer seal 52 to tighten the outer seal and, at the same time, reacts outwardly through the axially movable control stem 32 and the inner seal compressor 50 to apply an equal seal tightening compressive force to the inner seal 46 so that both the inner and outer stem seals are simultaneously tightened to the same degree. As shown, the ball 26 is rotated by a handle 64 connected to the outer end of the control stem.

It should be observed at this point that the position of the ball 26 along the axis 44 is determined finally by the axial thickness of the yieldable inner stem seal 46. Because of its yieldable character and its variable axial thickness, due to wear, compressive loading and other factors, the inner seal 46 allows an indefinite and variable axial displacement of the control stem 32 and the ball 26 integrally connected with the control stem. In this connection, it will be further appreciated that internal fluid pressure in the chamber 14 exerts an outward force on the ball 26 along the control stem axis 44. This is of advantage in tightening the inner stem seal 46 progressively as the internal fluid pressure increases, but can be a source of variable displacement of the ball 26 in a direction transverse to the inner ends of the flow passages 16, 18.

However, the valve 10, when closed, is effectively sealed against the leakage of fluid therethrough by sealing structure coacting with the ball 26 and responding to axial displacement of the ball 26 in such manner that the effectiveness with which the valve is sealed against the leakage of fluid therethrough is not disturbed by variations in the position of the ball 26 along the axis 44 of the control stem 32 integral with the ball.

Having reference to FIGS. 1, 2 and 3, the spherically curved external ball surface 30 is slidably engaged on opposite sides of the ball by two "floating" valve seats 66, 68 annular in form and identical in construction. Each of the seats 66, 68 has an adherently simple construction which is economical to manufacture.

The seat 66, which is structurally identical to the seat 68, comprises an inner sealing ring 70 formed of a yieldable polymeric material, for example polytetrafluoroethylene. The sealing ring 70 formed of a yieldable polymeric material is confined against radial expansion and distortion by an encircling metal band 72 circumferentially embracing the periphery of the ring 70. In the preferred construction illustrated, two annular side flanges 74, 76 formed on the band 72 project radially inward in embracing relation to the outer periphery of the ring 70 to support the structure of the ring 70 against forces tending to produce distortion and "cold flow" of the ring 70 under load.

The side of the ring 70 confronting the ball 26 defines an annular ball sealing surface 78 having a concave curvature of segmental spherical shape conforming in curvature to the spherical curvature of the opposing ball surface 30. The ball sealing surface 78, thus shaped, fits against the ball surface 30 to provide a mutual surface engagement between the ring 70 and ball 26 well suited for forming a fluid-tight seal between the ball and ring 70.

The opposite side of the ring 70 defines a second annular sealing surface 80 having a concave spherical curvature and being substantially a mirror image of the surface 78. The ring 70 is of "solid" construction, as shown, there being no open cavities in the sealing ring between the sealing surfaces 78, 80.

The seat ring surface 80 fits slidably against an annular seat support surface 82 having a convex curvature of spherical shape conforming to the spherical curvature of the external ball surface 30. Thus, the radii of curvature of the seat support surface 82, the two sealing surfaces 80, 78 and the external ball surface 30 are all equal. The center of curvature of the seat support surface 82 is identified in FIG. 1 by the number 83 and the center of curvature of the ball surface 30 is identified by the number 84.

The spherical seat support surface 82 is defined by the inner end of an annular seat support element 86 of cylindrical shape slidably mounted in the valve body section 20 in coaxial relation to the passage 16 for translation in a direction toward and away from the ball 26. The inner end of the seat support 86 projects into the chamber 14 and a central bore 88 in the seat support is coaxial with and forms an inward continuation of the passage 16.

The seat support 86 has a generally overall cylindrical shape and is slidably mounted in a cylindrical counterbore 90 in the inner end of the passage 16. A slidable circumferential seal is formed between the seat support 86 and the encircling structure of the valve body 20 by an O-ring seal 92 disposed between two backup rings 94, 96 in an annular groove 97 in the seat support 86.

The seat support 86 is continuously urged toward the ball 26 to produce a minimum effective sealing pressure between the mutually engaged seat support and seat surfaces 82, 80 and between the seat and ball surfaces 78, 30 by means of an annular spring 98 of sinusoidal or wavy form interposed between the bottom of the counterbore 92 and the adjacent outer end surface 100 of the seat support.

As indicated, the floating seat 68 is identical in construction to floating seat 66. Moreover, the seat 68 cooperates with a seat support construction which is identical to that described which cooperates with the seat 66. For convenience, component elements of the seat 68 and the structure cooperating with the seat 68 which are counterparts of component elements of the seat 66 and coacting structure are identified by the same reference numbers with the addition of the suffix "a."

The force of the spring 98 urging translation of the seat support 86 toward the ball 26 is supplemented by the differential force of fluid pressure in the corresponding passage 16 acting on a differential piston area of the seat support 86. As evident from an inspection of FIGS. 1, 2 and 3, fluid pressure in the passage 16 is applied to the radially outer end surface 100 of the seat support 86. This fluid pressure acting on the surface 100 urges the seat support 86 toward the ball and increases progressively in proportion to increases in the fluid pressure in the passage 16. In this connection, it will be noted that the adjacent seat sealing ring 70 is dimensioned so that its inner periphery is limited generally in diameter to the general diametrical size of the cylindrical bore 88 in the seat support 86 with the result that the maximum end area on the inner end of the seat support 86 exposed to the fluid pressure in the passage 16 is, as projected orthographically for reference purposes onto a plane perpendicular to the axis of the seat support 86, limited to a small fraction of the outer end area 100 of the seat support 86 as projected orthographically onto the same reference plane. As a consequence, the seat support 86 has a differential piston area exposed to fluid pressure in the passage 16 and acting in response to fluid pressure in the passage 16 to urge the slidable seat support 86 toward the ball 26 with a fluid force in addition to the spring force on the seat support.

The effect of this is to provide continuously between the floating seat 66 and the ball 26 and between the seat 66 and the seat support surface 82 an optimum sealing pressure which is adequate, but not excessive, for sealing the valve against leakage through the valve past the seat 66 when the valve is closed. As the differential fluid pressure between the passage 16 and the valve chamber 14 tending to induce the flow of fluid past the seat 66 from the passage 16 into the chamber 14 increases, the sealing pressure between the seat support surface 82 and the seat sealing surface 80 is increased and the sealing pressure between the sealing surface 78 and the ball surface 30 is equally increased to maintain the effectiveness of the seals against leakage of fluid past the seat 66. The action of the spring 98 assures that the seat sealing pressure is adequate, even when the fluid pressure in the passage 16 is low, to maintain the sealing effectiveness of the seat 66 to prevent the leakage of fluid from the passage 16 into the chamber 14.

It will be appreciated that during the major portion of the rotary movement of the ball 26 between its open and closed valve positions, the valve bore 28 is at least partially aligned with the inner ends of the passages 16, 18 with the result that the differential pressure between the respective passages 16, 18 and the valve chamber 14 is greatly reduced in relation to the differential pressure which normally must be withstood by the valve without leakage when the valve is closed. By virtue of this dynamic action, the pressure force applied by the seat support 86 to the seat seal 70 while the valve ball 26 is being turned through the major portion of its rotary excursion of movement is greatly reduced in relation to the sealing force applied to the seat when the valve is fully closed. As a consequence, the full capacity of the valve, when closed, to seal against leakage through the valve is realized together with a most advantageous minimization of the energy required to open and close the valve and a concomitant minimization of wear on the valve seats as an incident to opening and closing of the valve.

The floating seats 66, 68 and the structures coacting with the respective seats are equally effective in blocking the leakage of fluid from the respective passages 16, 18 into the chamber 14 with the consequence that the effectiveness of both seats 66, 68 can be tested by removing a valve chamber drainage plug 102 from the bottom of the main body section 24 to determine that no fluid will leak into the chamber 14 from the passages 16, 18 after the chamber 14 has drained.

Adverting back to the dynamic action of the valve in response to axial displacement of the ball 26, it will be appreciated that axial displacement of the ball 26 tends to change the spacing of the center 84 of the external ball surface 30 from the center 83 of curvature of the seat support surface 82, for example. However, this action is compensated for automatically by translation of the seat support 86 either toward or away from the ball 26 to provide the spacing of the center of curvature 83 of the surface 82 from the ball center 84 necessary to maintain optimum sealing engagement of the seat 66 with both the seat support surface 82 and the external ball surface 30. At the same time, the spherical shaping of the seat support surface 82, opposing seat surface 80, seat sealing surface 78 and ball spherical surface 30 permits the floating seat 66 to automatically tip or cant itself as necessary to continuously maintain an optimum sealing fit of the seat with both the ball surface 30 and the similarly curved seat support surface 82.

This dynamic action can be readily visualized with reference to FIGS. 2 and 3, FIG. 3 illustrating the relative positions of the parts after the ball 26 has been displaced upwardly somewhat from its position illustrated in FIG. 2. Because of the indefinite and variable thickness of the inner stem seal 46 which finally determines the transverse position of the ball 26 in relation to the passages 16, 18, the ball may have any of an infinite number of positions within a rather substantial position range, the valve maintaining by its dynamic action its full sealing effectiveness for all positions of the ball. The ball 26 is illustrated in its open position in FIGS. 2 and 3 to aid in visualizing the dynamic change in the relationship of the parts as the ball is displaced transversely in relation to the passages 16, 18. The relationship of the seat 66 to the ball 26 is not essentially changed in relation to the action described by turning the ball to its closed valve position.

In the modified construction illustrated in FIG. 4, component elements similar to structural elements previously described are identified by the same reference numbers with the addition of the suffix "b." By means of the modified construction, specific advantages are achieved in the manner in which the seat support 86b is sealed to the adjacent body component 20b and spring biased toward the ball 26b.

The combined sealing and spring biasing action desired is provided by means of an annular spring seal 106 formed of a suitable spring material and having, as viewed in radial section, a U-shaped medial portion 108 intervening between the bottom 110 of the counterbore 90b and the adjacent outer end of the spring support 86b. Two cylindrical flanges 112, 114 formed on the U-shaped medial portion 108 of the spring seal element 106, as shown in FIG. 4, extend in opposite directions and fit into shallow counterbores 116, 118 in the adjacent ends of the passage 16b in the body 20b and the passage continuation 88b in the seat support 86b to maintain the spring seal 106 in concentric relation to the seat support 86b and anchor the spring seal 106 against radial expansion. The bottom 110 of the counterbore 90b and the opposing outer end of the slidable seat support 86b are shaped to define two sharp annular corners 120, 122 which engage opposite sides of the U-shaped medial portion 108 of the spring seal 106 adjacent the respective flanges 112, 114.

In the preferred construction illustrated, a completely impervious seal is formed between the stationary body section 20b and the axially movable seat support element 86b by metal fusion. As shown in FIG. 4, a circumferential weld is formed between the spring metal seal flange 112 and the body section 20b by a continuous annular butt or bead weld 124 formed between the extreme edge of the flange 112 and the body section. Similarly, a continuous annular butt or bead weld 126 is formed between the extreme edge of the flange 114 and the seat support element 86b. Thus joined by welding to the body section 20b and to the seat support element 86b, the spring seal 106 forms an impervious annular bridge between the body section 20b and the seat support element 86b.

The dimensional relationship of the parts is such that upon being assembled with coacting parts, the spring seal 106 is contracted axially at the flanges 112, 114 thus placing the U-shaped medial portion 108 of the spring seal under a residual stress which continuously urges the seat support 86b against the seat seal ring 70b. Fluid under pressure in the passage 16b operates within the U-shaped medial portion 108 of the spring seal to exert an axial expansion action on the seal which intensifies its sealing engagement with the coacting annular corners 120, 122 and increases the inward axial force applied by the spring seal to the seat support 86b to tighten the sealing pressure on the seat 66b in the manner described in relation to the first illustrated embodiment of the invention.

It will be appreciated that the invention is not necessarily limited to the specific construction illustrated, but includes variants within the spirit and scope of the invention as defined by the claims.

The invention is claimed as follows:

1. A ball valve comprising, in combination, valve body means defining an internal valve chamber and two flow passages opening into said chamber, a flow control ball disposed rotatably within said chamber and having an external surface of spherical curvature, said body means defining a control bore opening outwardly from said chamber, a control stem integral with said ball and extending outwardly through said control bore, said body means defining an inner annular well encircling said control stem and opening inwardly, an inner annular stem seal formed of yieldable material and having an axial thickness which is at least equal to the radial thickness of the seal, said inner stem seal being disposed in said inner well in encircling relation to said stem, a circular inner seal compressor supported on said stem and extending outwardly into said inner well into compressive engagement with said inner seal, said body means defining an outer annular well encircling said stem and opening outwardly, an outer annular stem seal formed of yieldable material and being disposed in said outer well in encircling relation to said stem, a circular outer seal compressor encircling said stem in axially movable relation thereto and extending inwardly into said outer well into compressive engagement with said outer seal, stem seal tightening means coacting with said outer seal compressor and said stem to react inwardly on said outer seal compressor and outwardly through to said stem on said inner seal compressor to tighten said outer and inner stem seals to the same degree while incidentally displacing said ball along the axis of said control stem, bearing means supported on said body means and journalling said ball for rotation about the axis of said control stem, two hollow generally cylindrical valve seat supports slidably supported on said body means in coaxial alignment with said respective passages and extending into opposite sides of said chamber to form inward continuations of said respective passages, spring means coacting with said respective seat supports to yieldably urge translation of the latter toward said ball, an annular seat support seal coacting with each of said seat supports and said body means to form therebetween a fluid-tight seal permitting translation of the coacting seat support toward and away from said ball, each of said seat supports having a differential piston area thereon continuously exposed to the fluid pressure in the adjacent passage and providing in response to fluid pressure in the adjacent passage a pressure force on the seat support urging the latter toward said ball, each of said seat supports defining on the inner end thereof an annular seat support surface having an inwardly convex spherical curvature corresponding to the spherical curvature of said external ball surface, two annular valve seats intervening between said ball and said respective seat supports, and each of said annular valve seats defining two annular sealing surfaces of concave spherical curvature fitting sealably against said external ball surface and the seat support surface of the adjacent seat support.

2. A ball valve comprising, in combination, valve body means defining an internal valve member and two flow passages opening into said chamber, a flow control ball disposed rotatably within said chamber and having an external surface of spherical curvature, said body means defining a control bore opening outwardly from said chamber, a control stem integral with said ball and extending outwardly through said control bore, said body means defining an annular well encircling said control stem and opening inwardly, an annular stem seal formed of yieldable material and being disposed in said well in encircling relation to said stem, a circular seal compressor supported on said stem and compressively engaging the inner face of said seal, stem seal tightening means coacting with said stem to displace said stem and said compressor outwardly to tighten said seal and incidentally displace said ball along the axis of said stem, two hollow valve seat supports of generally cylindrical form slidably supported on said body means in coaxial alignment with one of said passages to define the inner end of said one passage, spring means coacting with said seat support to yieldably urge the latter to move toward the ball, an annular seal coacting with said seat support and said body means to form therebetween a fluid-tight seal permitting movement of the coacting seat support toward and away from said ball, said seat support having a differential piston area thereon continuously exposed to the fluid pressure in said one passage and providing in response to fluid pressure in said one passage a pressure force on the seat support urging the latter toward said ball, said seat support defining on the inner end thereof an annular seat support surface having an inwardly convex spherical curvature corresponding to the spherical curvature of said external ball surface, an annular valve seat intervening between said ball and said seat support, and said annular valve seat defining two annular sealing surfaces of concave spherical curvature fitting sealably and respectively against said external ball surface and said seat support surface.

3. A ball valve, as set forth in claim 2, in which said annular sealing surfaces on each valve seat are defined on opposite side of an inner sealing ring formed of yieldable polymeric material and constituting a component of the valve seat, the sealing ring of each valve seat being closely encircled by a metal band constituting a component of the valve seat and embracing the outer periphery of the inner sealing ring to restrain the latter against expansion by pressure forces thereon.

4. A ball valve, as set forth in claim 3, in which the construction of said sealing ring of each seat intervening between said sealing surfaces on the sealing ring is essentially solid in the sense of there being an absence of open cavities present between said sealing surfaces defined by the sealing ring.

5. A ball valve comprising, in combination, body means defining an internal valve chamber and two flow passages opening into said chamber, a flow control ball defining a flow bore therein and being rotatably disposed within said chamber to control communication between said passages, said ball defining an external surface of spherical curvature thereon, an annular valve seat support disposed in coaxial alignment with one of said passage and forming an inward continuation of said one passage, said valve seat support being movable with respect to said body means toward and away from said ball, means forming between said seat support and said body means a circular seal permitting movement of said seat support toward and away from said ball, spring means yieldably urging said seat support toward said ball, and an annular valve seat intervening between and slidably engaging said external ball surface and the adjacent inner end of said seat support and continuously forming a seal therebetween.

6. A ball valve, as set forth in claim 5, in which said annular valve seat comprises an inner sealing ring formed of yieldable polymeric material and being closely encircled by a metal band embracing the outer periphery of the inner sealing ring to restrain the latter against expansion by pressure forces applied to the inner sealing ring and said inner sealing ring defining on opposite sides thereof two annular sealing surfaces slidably engaging said external ball surface and the inner end of said seat support respectively to establish slidable seals therewith, said valve seat being free to move in any radial direction with respect to said one passage continuously to maintain sealing fits between said respective sealing surfaces and said external ball surface and the inner end of said valve seat support.

7. A ball valve, as set forth in claim 6, in which the construction of said seat sealing ring intervening between said sealing surfaces on said ring is essentially solid in the sense of their being an absence of open cavities present between said sealing surfaces defined by said sealing ring.

8. A ball valve, as set forth in claim 5, in which the inner end of said seat support engaged by said seat defines an annular seat support surface having an inwardly convex curvature of spherical shape conforming to the spherical curvature of said external ball surface, and said annular valve seat defines on opposite sides thereof two annular sealing surfaces of inwardly concave spherical curvature conforming substantially to the spherical curvature of said external ball surface and said support surface on said seat support, said sealing surfaces on said seat support fitting slidably against said external ball surface and said seat support surface respectively to form effective seals therewith, said valve seat being free to move in any radial direction with respect to said one passage continuously to maintain the seals between said seat and said ball and seat support respectively.

9. A ball valve, as set forth in claim 8, in which said sealing surfaces on said valve seat are defined by an inner sealing ring constituting a component of said valve seat and being formed of a yieldable polymeric material, said sealing ring is of solid construction in the sense of there being an absence of open cavities intervening between said sealing surfaces on opposite sides of the sealing ring, and said seat includes a metal band closely encircling said sealing ring of the seat to confine the latter against expansion by pressure forces applied to said sealing ring of the seat.

10. A ball valve, as set forth in claim 5, in which said means forming a seal between said seat support and said body means comprises an annular spring seal having as viewed in radial section a medial annular portion of generally U-shape opening radially inward and connecting with annular flanges forming components of the spring seal and extending axially in opposite directions into said one passage and said seat support to anchor the spring seal against radial displacement and to hold the seal in coaxial alignment with said one passage, said spring seal having a residual stress therein tending to spread said annular portion of U-shape in an axial direction to hold said spring seal firmly against both said body means and said seat support to form continuously effective seals therewith and to bias said seat support toward said ball with a spring force to which is added an axial force of fluid pressure entering said medial annular portion of the spring seal from said one passage.

11. A ball valve, as set forth in claim 5, in which the area of said seat support exposed to the fluid pressure in said one passage includes a differential area facing away from said ball and functioning in response to exposure of said seat support to the fluid pressure in said one passage to transmit to said seat support a force of fluid pressure toward said ball.

12. A ball valve comprising body means defining an internal valve chamber and two flow passages opening into said chamber, a flow control ball defining a flow bore therein and being rotatably disposed within said chamber, bearing means supported on said body means and journalling said ball for rotation about an axis generally transverse to one of said passages, an annular seat support disposed in generally coaxial relation to said one passage and defining an inward continuation thereof, means coacting with said seat support and said body means to form a seal therebetween and to urge said seat support toward said ball, said seat support defining on the ball end thereof an inwardly convex annular seat support surface, an annular valve seat intervening between said ball and said seat support in generally concentric relation to the inner end of said one passage, said valve seat including an inner sealing ring of yieldable polymeric material defining two annular sealing surfaces of concave shape fitting respectively against the external surface of said ball and said seat support surface, and said sealing ring of said seat being free of open cavities intervening between said sealing surfaces thereon.

13. A ball valve, as set forth in claim 12, in which the area of said seat support exposed to the fluid pressure in said one passage includes a differential area facing away from said ball and functioning in response to exposure of said seat support to the fluid pressure in said one passage to transmit to said seat support a force of fluid pressure toward said ball.

14. A ball valve, as set forth in claim 12, in which said body means defines an inner counterbore in generally coaxial relation to said one passage and said seat support is slidably disposed in said counterbore; said body means is shaped to define at the bottom of said counterbore a narrow, inwardly exposed first sealing edge disposed in adjacent relation to said one passage; said seat support defines on the outer end thereof a narrow, outwardly exposed second sealing edge adjacent said passage; said means forming a seal between said seat support and said body means comprises an axially spreadable spring seal disposed in said counterbore between the bottom thereof and the outer end of said seat support; said spring seal defining an annular, seal spreading cavity therein opening radially inward into said one passage to receive fluid pressure from said one passage for axially spreading said spring seal by the force of fluid pressure entering said cavity from said one passage; said spring seal being engaged along opposite sides thereof by said first and second sealing edges, said spring seal having a residual stress therein tending to spread the spring seal axially against the restraint of said annular sealing edges to produce between said spring seal and said respective sealing edges high intensity sealing pressures which are intensified by axial spreading forces applied to said spring seal by fluid pressure entering said spreading cavity from said one passage.

15. A ball valve, as set forth in claim 14, in which said first and second sealing edges engage opposite sides of a medial annular portion of said spring seal which is generally U-shaped in radial section, and in which said spring seal includes two annular flanges integral with and extending axially in opposite directions from radially inward portions of said U-shaped spring seal into said one passage and said seat support to hold said spring seal in coaxial alignment with said one passage.

16. A ball valve comprising, in combination, body means defining an internal valve chamber and two flow passages opening into said chamber, a flow control ball rotatably disposed within said chamber and having an external surface of spherical curvature, said body means defining a counterbore in the inner end of one of said passages, an annular valve seat support disposed in said counterbore for movement toward and away from said ball, said seat support defining on the inner end thereof an annular seat support surface having an inwardly convex curvature, an annular valve seat intervening between said ball and said seat support surface in sealing contact with both the spherical exterior surface of the ball and said seat support surface to form a seal therebetween, said valve seat being free to move in any direction radially with respect to said one passage, an axially spreadable spring seal of annular form disposed in said counterbore between the bottom thereof and the adjacent outer end of said seat support, said spring seal defining an annular, seal spreading cavity therein opening radially inward into said one passage to receive from said one passage fluid pressure which operates in said seal spreading cavity to spread the seal axially, said spring seal having annular sealing engagement along opposite sides thereof with said body means at the bottom of said counterbore and with the outer end of said seat support, and said spring seal having a residual stress therein tending to spread the spring seal axially into firm engagement with the outer end of said seat support and said body means at the bottom of said counterbore to form therewith effective seals which are intensified by axial spreading forces applied to said spring seal by fluid pressure entering said spreading cavity from said one passage.

References Cited

UNITED STATES PATENTS

| 3,164,362 | 1/1965 | Lavigueur | 251—174 |
| 3,273,852 | 9/1966 | Bipert | 251—174 XR |
| 3,266,769 | 8/1966 | Shand | 251—174 XR |

FOREIGN PATENTS

| 691,007 | 5/1953 | Great Britain. |
| 1,117,958 | 11/1961 | Germany. |

WILLIAM F. O'DEA, *Primary Examiner.*

H. W. WEAKLEY, *Assistant Examiner.*

UNITED STATES PATENT OFFICE
CERTIFICATE OF CORRECTION

Patent No. 3,414,233　　　　　　　　　　　　　　　　　　　December 3, 1968

Werner K. Priese et al.

It is certified that error appears in the above identified patent and that said Letters Patent are hereby corrected as shown below:

Column 3, line 7, "obvious" should read -- obviously --. Column 4, line 1, "adherently" should read -- inherently --. Column 5, lines 57 and 58, "concomitant" should read -- concompetent --. Column 7, line 74, "valve member" should read -- valve chamber --. Column 8, line 38, "opposite side" should read -- opposite sides --; line 58, "passage" should read -- passages --. Column 9, line 12, "their" should read -- there --.

Signed and sealed this 17th day of March 1970.

(SEAL)
Attest:

Edward M. Fletcher, Jr.　　　　　　　　　　　　　　WILLIAM E. SCHUYLER, JR.
Attesting Officer　　　　　　　　　　　　　　　　　　Commissioner of Patents